United States Patent
Ye et al.

(10) Patent No.: US 11,929,669 B2
(45) Date of Patent: Mar. 12, 2024

(54) TOTEM-POLE BRIDGELESS POWER FACTOR CORRECTION DEVICE AND POWER SUPPLY

(71) Applicant: InventChip Technology Co., Ltd., Shanghai (CN)

(72) Inventors: Zhong Ye, Plano, TX (US); Danyang Zhu, Cary, NC (US); Qixiang Han, Shanghai (CN)

(73) Assignee: InventChip Technology Co., Ltd., Shanghai (CN)

( * ) Notice: Subject to any disclaimer, the term of this patent is extended or adjusted under 35 U.S.C. 154(b) by 195 days.

(21) Appl. No.: 17/663,286

(22) Filed: May 13, 2022

(65) Prior Publication Data

US 2022/0271651 A1   Aug. 25, 2022

Related U.S. Application Data

(63) Continuation of application No. PCT/US2022/070349, filed on Jan. 26, 2022.

(30) Foreign Application Priority Data

Jan. 29, 2021 (CN) .......................... 202110124647.5

(51) Int. Cl.
*H02M 1/42* (2007.01)
*G05F 1/565* (2006.01)
*G05F 1/70* (2006.01)
*H02M 1/08* (2006.01)

(52) U.S. Cl.
CPC .......... *H02M 1/4208* (2013.01); *H02M 1/083* (2013.01); *G05F 1/565* (2013.01); *G05F 1/70* (2013.01); *H02M 1/4225* (2013.01)

(58) Field of Classification Search
CPC ........ G05F 1/565; G05F 1/70; H02M 1/4208; H02M 1/4225
See application file for complete search history.

(56) References Cited

U.S. PATENT DOCUMENTS

| | | | |
|---|---|---|---|
| 10,536,074 B2 * | 1/2020 | Hashimoto | H02M 7/219 |
| 2014/0002033 A1 | 1/2014 | Chen et al. | |
| 2014/0132191 A1 | 5/2014 | Heo | |
| 2016/0241132 A1 * | 8/2016 | Lin | H02M 1/4225 |
| 2018/0062504 A1 * | 3/2018 | Mei | G05F 1/70 |

* cited by examiner

*Primary Examiner* — Gary A Nash
(74) *Attorney, Agent, or Firm* — AP3 Law Firm PLLC (57) ABSTRACT

The present disclosure relates to a totem pole bridgeless power factor correction device and a power supply system. The device includes a power factor correction module. The power factor correction module includes a first transistor, a second transistor, a third transistor, a fourth transistor, an inductor and a control module for generating a zeroth control signal in the first time period to control the third transistor and the fourth transistor to be in an off state, performing a zero-crossing detection on an AC voltage in the first time period, generating a first control signal to control a conduction state of the first transistor and the second transistor before the AC voltage crosses zero, and generating a second control signal to control the conduction state of the first transistor and the second transistor after the AC voltage crosses zero. The embodiments of the present disclosure can enable the device to smoothly transition the current when the device is at the zero-crossing point, and improve the stability and efficiency of the device.

20 Claims, 6 Drawing Sheets

TOTEM-POLE BRIDGELESS POWER FACTOR CORRECTION DEVICE AND POWER SUPPLY

This application is a continuation of Application No. PCT/US2022/070349, entitled "Totem-Pole Bridgeless Power Factor Correction Device and Power Supply," filed on Jan. 26, 2022, which claims priority to Chinese Patent Application No. 202110124647.5, filed on Jan. 29, 2021, which is hereby incorporated by reference in its entirety.

TECHNICAL FIELD

The present disclosure relates to the technical field of power supplies, and in particular, to a totem-pole bridgeless power factor correction device, a power supply and a power supply system.

BACKGROUND

The application of power electronic technology can greatly increase the power density of the electric energy conversion device, and effectively reduce the volume and weight of the device. With the rapid development of power electronic technology, there are more and more power electronic devices, and almost every power electronic device needs to convert alternating current (AC) into direct current (DC) through rectification and conversion technology. In order to reduce the mutual influence of load harmonics on the grid and other equipment, the input current harmonic content and the power density of each electronic device need to meet the current harmonic requirements of AC power equipment. Therefore, it is of great significance to study power factor correction (PFC) converters with high efficiency and high power density.

In comparison with the traditional bridged power factor correction circuits, the efficiency of the totem-pole bridgeless power factor correction circuit is higher (in a range from 0.5% to 1%). The totem-pole bridgeless power factor correction circuit is the mainstream of the new generation of PFC. With the increasing maturity of wide band gap semiconductors, totem-pole bridgeless power factor correction circuits will be widely used. However, the zero-crossing current control of the totem-pole bridgeless power factor correction circuit is a difficult point. Especially, it is hard to achieve a smooth current transition.

SUMMARY

In view of this, the present disclosure proposes a totem-pole bridgeless power factor correction device, a power supply and a power supply system to achieve a smooth transition of the current at the zero-crossing point.

In accordance with an embodiment, a totem-pole bridgeless power factor correction device comprises a power factor correction module and a control mode.

The power factor correction module is used to perform power factor correction on an alternating current (AC) power input from an AC power source, and wherein the power factor correction module comprises a first transistor, a second transistor, a third transistor, a fourth transistor, and an inductor, and wherein the first transistor, the third transistor, the fourth transistor, and the second transistor are connected in sequence, and wherein a first terminal of the inductor is connected to a common node of the first transistor and the second transistor, a second terminal of the inductor is connected to a first terminal of the AC power source, and a second terminal of the AC power source is connected to a common node of the third transistor and the fourth transistor, and wherein the third transistor and the fourth transistor are used for providing synchronous rectification, and the first transistor and the second transistor are used to implement the power factor correction on the AC power input.

The control module is electrically connected to a control terminal of each transistor in the power factor correction module, and wherein the control module is configured to generate a zeroth control signal in a first time period to control the third transistor and the fourth transistor to be in an off state, perform a zero-crossing detection on an AC voltage of the AC power source in the first time period, generate a first control signal before the AC voltage crosses zero to control a conduction state of the first transistor and the second transistor, and after the AC voltage crosses zero, generate a second control signal to control the conduction state of the first transistor and the second transistor, and wherein any one of the first control signal and the second control signal used to control the first transistor and the second transistor is configured such that the first transistor and the second transistor are in an off state before the AC voltage crosses zero, and the other of the first control signal and the second control signal is used to control one of the first transistor and the second transistor to be in an off state after the AC voltage crosses zero, and control the other of the first transistor and the second transistor to be turned on and off at a targeted switching frequency, and wherein a turn-on duty cycle of the other of the first transistor and the second transistor gradually increases, and after the first time period, generate a third control signal to control the first transistor and the second transistor to switch at a first frequency, and control the third transistor and the fourth transistor to switch at a second frequency, and wherein the targeted switching frequency is greater than the first frequency, and the first frequency is greater than the second frequency.

In accordance with another embodiment, the control module is further configured to determine a direction of an AC voltage change, and generate the first control signal and the second control signal according to the direction of the AC voltage change.

In accordance with another embodiment, the control module is further configured to generate the first control signal to control the first transistor and the second transistor to be off before the AC voltage crosses zero when the control module determines that the direction of the AC voltage change is from a positive voltage to a negative voltage, and generate the second control signal to control the second transistor to be in an off state after the AC voltage crosses zero, and control the first transistor to be turned on and off at the targeted switching frequency, and wherein a turn-on duty cycle of the first transistor gradually increases.

In accordance with another embodiment, the control module is further configured to generate the first control signal to control the first transistor and the second transistor to be off before the AC voltage crosses zero when the control module determines that the direction of the AC voltage change is from a negative voltage to a positive voltage, and generate the second control signal to control the first transistor to be in an off state after the AC voltage crosses zero, and control the second transistor to be turned on and off at the targeted switching frequency, and wherein a turn-on duty cycle of the second transistor gradually increases.

In accordance with another embodiment, a gradual increase of the turn-on duty cycle comprises increasing the turn-on duty cycle linearly or non-linearly until a full duty cycle is reached.

In accordance with another embodiment, the targeted switching frequency is K times the first frequency, and wherein K>1.

In accordance with another embodiment, the control module comprises a pulse width modulation (PWM) controller.

In accordance with another embodiment, the power factor correction module further comprises a first capacitor, a second capacitor, and a third capacitor, and wherein the first terminal of the inductor is electrically connected to the first terminal of the AC power source, and the second terminal of the inductor is electrically connected to a source of the first transistor and a drain of the second transistor, a drain of the first transistor is electrically connected to a first terminal of the first capacitor, a drain of the third transistor and a first terminal of the third capacitor, and wherein the first terminal of the third capacitor is configured to output a conversion voltage, a source of the third transistor is electrically connected to a second terminal of the first capacitor, a drain of the fourth transistor, a first terminal of the second capacitor and the second terminal of the AC power source, and a source of the second transistor is electrically connected to a source of the fourth transistor, a second terminal of the second capacitor and a second terminal of the third capacitor.

In accordance with another embodiment, a power supply comprises the totem-pole bridgeless power factor correction device.

In accordance with yet another embodiment, a power supply system comprises the power supply.

According to the following detailed description of exemplary embodiments with reference to the accompanying drawings, other features and aspects of the present disclosure will become clear.

BRIEF DESCRIPTION OF THE DRAWINGS

The drawings are included in the specification and are part of the specification. The drawings and specification illustrate exemplary embodiments, features, and aspects of the present disclosure, and are used to explain the principle of the present disclosure.

DETAILED DESCRIPTION OF ILLUSTRATIVE EMBODIMENTS

Hereinafter, various exemplary embodiments, features, and aspects of the present disclosure will be described in detail with reference to the drawings. The same reference numerals in the drawings indicate elements with the same or similar functions. Although various aspects of the embodiments are shown in the drawings, unless otherwise noted, the drawings are not necessarily drawn to scale.

The dedicated word "exemplary" here means "serving as an example, embodiment, or illustration." Any embodiment described herein as "exemplary" need not be construed as being superior or better than other embodiments.

In addition, in order to better illustrate the present disclosure, numerous specific details are given in the following specific embodiments. Those skilled in the art should understand that the present disclosure could also be implemented without certain specific details. In some examples, the methods, means, elements, and circuits well known to those skilled in the art have not been described in detail in order to highlight the gist of the present disclosure.

Figure 1:
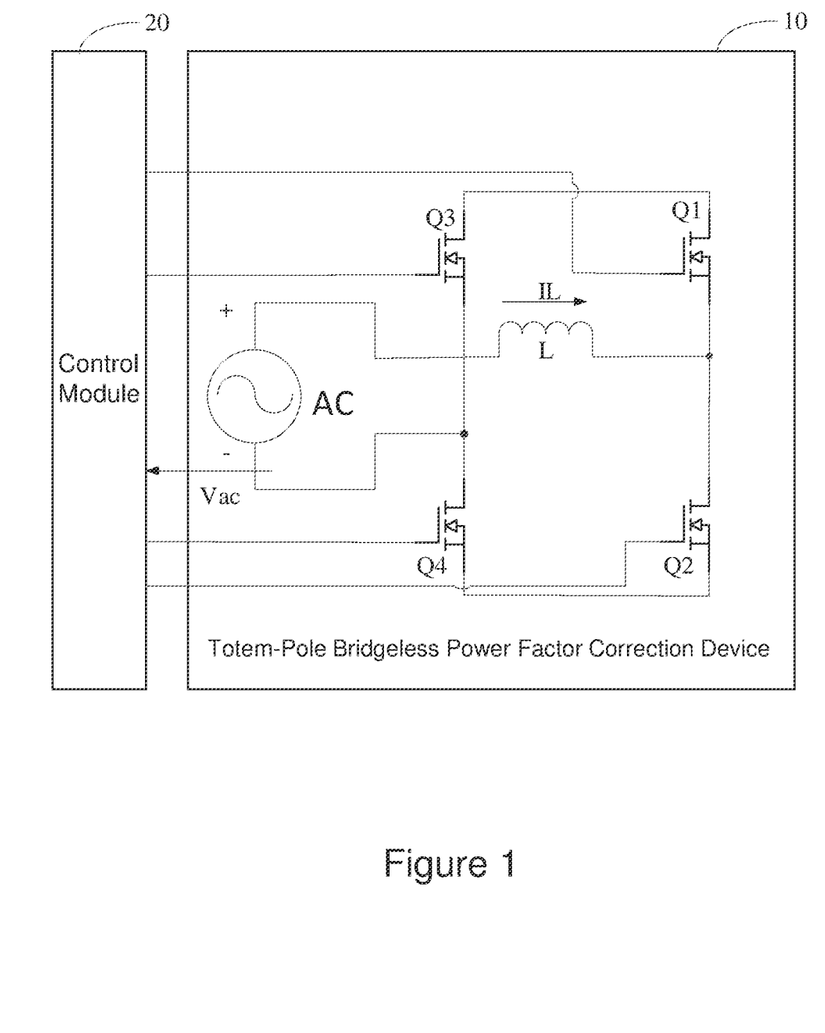
FIG. 1 shows a schematic diagram of a totem-pole bridgeless power factor correction device according to an embodiment of the present disclosure.

FIG. 1 shows a schematic diagram of a totem-pole bridgeless power factor correction device according to an embodiment of the present disclosure. The totem-pole bridgeless power factor correction device comprises a power factor correction module 10 and a control module 20.

The power factor correction module 10 is used to perform power factor correction on the alternating current input from the AC power supply. The power factor correction module 10 includes a first transistor Q1, a second transistor Q2, a third transistor Q3, a fourth transistor Q4 and an inductor L. The first transistor Q1, the third transistor Q3, the fourth transistor Q4, and the second transistor Q2 are connected in sequence. A first terminal of the inductor L is connected to a common node of the first transistor and the second transistor. A second terminal of the inductor L is connected to a first terminal of the AC power supply. A second terminal of the AC power supply is connected to a common node of the third transistor Q3 and the fourth transistors Q4. The third transistor Q3 and the fourth transistor Q4 are used for achieving synchronous rectification, and the first transistor Q1 and the second transistor Q2 are used for achieving power factor correction.

The control module 20 is electrically connected to a control terminal of each transistor in the power factor correction module 10. The control module 20 is used for generating a zeroth control signal in a first time period to control the third transistor Q3 and the fourth transistor Q4 to be in an off state. In the first period of time, the control module 20 is configured to detect the zero-crossing of the AC voltage Vac. The control module 20 is configured to generate a first control signal before the AC voltage crosses zero to control the conduction state of the first transistor Q1 and the second transistor Q2, and generate a second control signal after the AC voltage crosses zero to control the conduction state of the first transistor Q1 and the second transistor Q2.

Any one of the first control signal and the second control signal used to control the first transistor Q1 and the second transistor Q2 is configured such that the first transistor Q1 and the second transistor Q2 are in an off state before the AC voltage crosses zero. The other of the first control signal and the second control signal is used to control one of the first transistor Q1 and the second transistor Q2 to be in an off state after the AC voltage crosses zero, and control the other of the first transistor Q1 and the second transistor Q2 to be turned on and off at a targeted switching frequency. A turn-on duty cycle of the other of the first transistor and the second transistor gradually increases. After the first time period, the control module 20 is configured to generate a third control signal to control the first transistor Q1 and the second transistor Q2 to switch at a first frequency, and control the third transistor Q3 and the fourth transistor Q4 to switch at a second frequency. The targeted switching frequency is greater than the first frequency, and the first frequency is greater than the second frequency.

Through the above device, the embodiment of the present disclosure can generate the zeroth control signal in the first time period to control the third transistor and the fourth transistor to be in the off state, perform zero-crossing detection on the alternating voltage of the alternating current, generate a first control signal to control the conduction state of the first transistor and the second transistor before the AC voltage crosses zero, and generate a second control signal to control the conduction state of the first transistor and the second transistor after the AC voltage crosses zero so that one of the first transistor and the second transistor is in the off state, and control the other transistor to be turned on and off at the target switching frequency. The turn-on duty cycle of the other transistor is gradually increased so that the device can smoothly transition the current when the voltage crosses the zero point, thereby improving the stability and efficiency of the device.

The embodiment of the present disclosure does not limit the specific duration of the first time period, and those skilled in the art can determine it according to actual conditions. For example, it can be determined according to the device characteristics in the device such as the parasitic capacitance and inductance of the third transistor and the fourth transistor.

In one example, the starting point of the first time period can be determined according to the voltage magnitude of the AC voltage Vac. For example, when the AC voltage Vac drops from a positive peak value to a point lower than a first preset voltage (a positive voltage), this point can be regarded as the starting point of the first time period. At this time, the embodiment of the present disclosure may generate a zeroth control signal to control the third transistor Q3 and the fourth transistor Q4 to be in the off state, generate a first control signal to control the conduction state of the first transistor Q1 and the second transistor Q2, and generate a second control signal to control the conduction state of the first transistor Q1 and the second transistor Q2 after the AC voltage Vac crosses zero until the AC voltage Vac drops to a second preset voltage (the second preset voltage is a negative voltage. For example, it can be equal to the absolute value of the first preset voltage, or not equal). The AC voltage Vac drops to the second preset voltage. The time point can be used as the end point of the first time period. In the embodiments of the present disclosure, the appropriate first time period can be determined in advance according to the characteristics of each device in the device, and the appropriate first preset voltage and the second preset voltage can be selected in advance. The voltages are selected so that the time length between the first preset voltage and the second preset voltage is the time length of the first time period.

The description above is given by taking the time point when the AC voltage Vac drops to the second preset voltage as the end point of the first time period. This is an example. However, the embodiment of the present disclosure is not limited to this. In other embodiments, other methods can be used to determine the end point of the first time period. For example, after the AC voltage Vac crosses zero, the time point when the on-time duty cycle of the first transistor or the second transistor reaches or approaches the full duty can be taken as the end point of the first time period. Of course, a certain time after detecting that the duty cycle reaches or approaches the full duty cycle can be taken as the end point of the first time period. This is not limited in the embodiment of the present disclosure.

The first time period and its associated control are exemplarily introduced above by taking the AC voltage Vac crossing zero from positive to negative. It should be understood that the first time period when the AC voltage Vac crosses zero from negative to positive and its control are similar to the first time period when the AC voltage Vac crosses zero from positive to negative and its control, and hence are not be repeated herein.

It should be noted that the power factor correction module 10 may include a bridgeless power factor correction circuit, and the bridgeless power factor correction circuit may include multiple possible implementations, and the present disclosure does not limit the specific implementations thereof.

Figure 2:
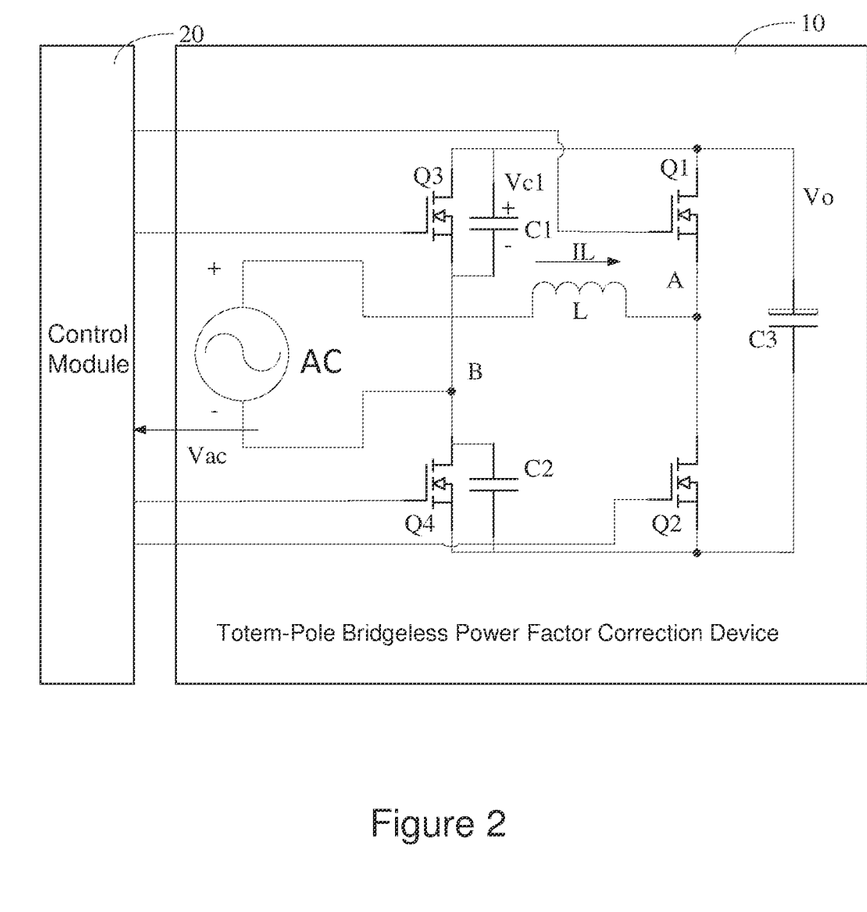
FIG. 2 shows a schematic diagram of a totem-pole bridgeless power factor correction device according to an embodiment of the present disclosure.

FIG. 2 shows a schematic diagram of a totem-pole bridgeless power factor correction device according to an embodiment of the present disclosure.

In a possible implementation, as shown in FIG. 2, the power factor correction module may further include an inductor L, a first capacitor C1, a second capacitor C2 and a third capacitor C3. The first terminal of the inductor L is electrically connected to the first terminal of the AC power source (for example, the positive end), and the second terminal of the inductor is electrically connected to a source of the first transistor Q1 and a drain of the second transistor Q2. A drain of the first transistor Q1 is electrically connected to a first terminal of the first capacitor C1, a drain of the third transistor Q3 and a first terminal of the third capacitor C3. The first terminal of the third capacitor C3 is configured to output a conversion voltage. A source of the third transistor Q3 is electrically connected to a second terminal of the first capacitor C1, a drain of the fourth transistor Q4, a first terminal of the second capacitor C2 and the second terminal of the AC power source (for example, the negative end). A source of the second transistor Q2 is electrically connected to a source of the fourth transistor Q4, a second terminal of the second capacitor C2 and a second terminal of the third capacitor C3.

In an example, each of the third transistor Q3 and the fourth transistor Q4 may be a Metal-Oxide-Semiconductor Field-Effect Transistor (MOSFET). The first transistor Q1 and the second transistor Q2 can be a MOS switch based on silicon carbide (SiC) or gallium nitride (GaN) to improve performance.

In an example, the first capacitor C1 and the second capacitor C2 may be the parasitic capacitors Coss of the third transistor Q3 and the fourth transistor Q4, respectively.

The possible implementations of the power factor correction module are exemplarily introduced above, but it should be understood that the embodiments of the present disclosure are not limited thereto. In other implementation manners, the power factor correction module may also include other components. It is also possible to replace each of the above-mentioned devices.

In a possible implementation manner, the control module includes a pulse width modulation (PWM) controller.

In an example, the embodiment of the present disclosure may use a PWM controller to generate the control signal of each transistor. For example, each control signal can be generated by setting the frequency and duty cycle of each signal.

Figure 3:
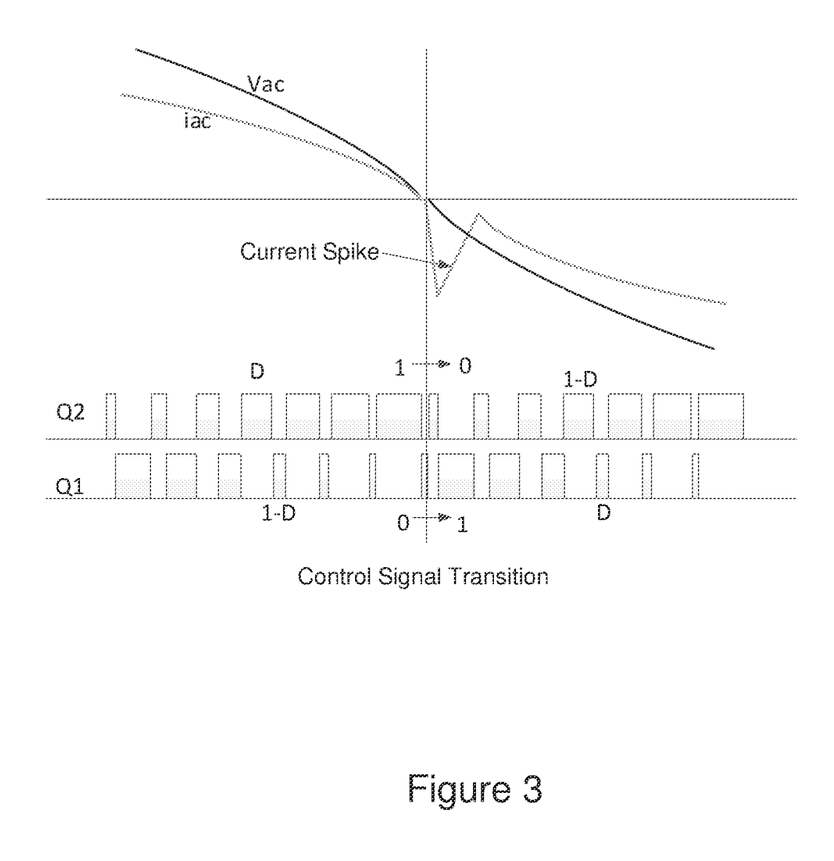
FIG. 3 shows a current waveform according to an embodiment of the present disclosure.

FIG. 3 shows a current waveform according to an embodiment of the present disclosure.

In an example, as shown in FIG. 3, before the AC voltage Vac crosses zero, the fourth transistor Q4 is turned on. The second transistor Q2 acts as an active transistor, and the duty cycle D of the control signal of the second transistor Q2 is equal to 1 or close to 1. In this case, the first transistor Q1 acts as a freewheeling switch, and the duty cycle of Q1 is equal to 1−D. In other words, the duty cycle of Q1 close to zero.

In one example, when the AC voltage Vac crosses the zero point, the third transistor Q3 and the fourth transistor Q4 are both turned off. Due to the parasitic capacitance or the influence of the first capacitance C1 and the second capacitance C2, the voltage on the drain of the fourth transistor (node B) is 0 volts (or close to 0 volts), and the voltage Vc1 on the drain of the third transistor Q3 is close to the output voltage Vo (for example, 400 V).

In an example, as shown in FIG. 3, after the zero-crossing point of the AC voltage Vac, the first transistor Q1 is an active transistor, and the duty cycle D of the first transistor Q1 jumps from 0 to 1 or close to 1. At this time, the second transistor Q2 is a freewheeling switch, and the duty cycle of the second transistor Q2 changes from 1 to 0 or close to 0. In this case, the voltage Vc1 of the drain of the third transistor Q3 is applied to the inductor L through the first transistor Q1, and a current spike is generated, which may damage the device.

The embodiments of the present disclosure can make a smooth transition when the current crosses zero, and prevent the peak current from damaging the device.

In a possible implementation manner, the control module may also be used for determining the direction of change of the AC voltage, and generating the first control signal and the second control signal according to the determined direction of change.

The embodiments of the present disclosure can determine the first control signal and the second control signal according to the direction of change of the AC voltage to control the conduction state of the first transistor and the second transistor so that the current can be smoothly transitioned when the AC voltage Vac crosses zero.

In a possible implementation manner, the control module may also be used for the following: when it is determined that the direction of change of the AC voltage Vac is from a positive voltage to a negative voltage, the first control signal is generated to control the first transistor Q1 and the second transistor Q2 to be in an off state before the AC voltage Vac crosses zero.

The second control signal is generated to control the second transistor Q2 to be in an off state after the AC voltage Vac crosses zero, and control the first transistor Q1 to turn on and off at a targeted switching frequency. The turn-on duty cycle of Q1 gradually increases.

In an example, the targeted switching frequency is related to the first frequency, and the targeted switching frequency may be greater than the first frequency. The duty cycle of the control signal can increase linearly.

Figure 4:
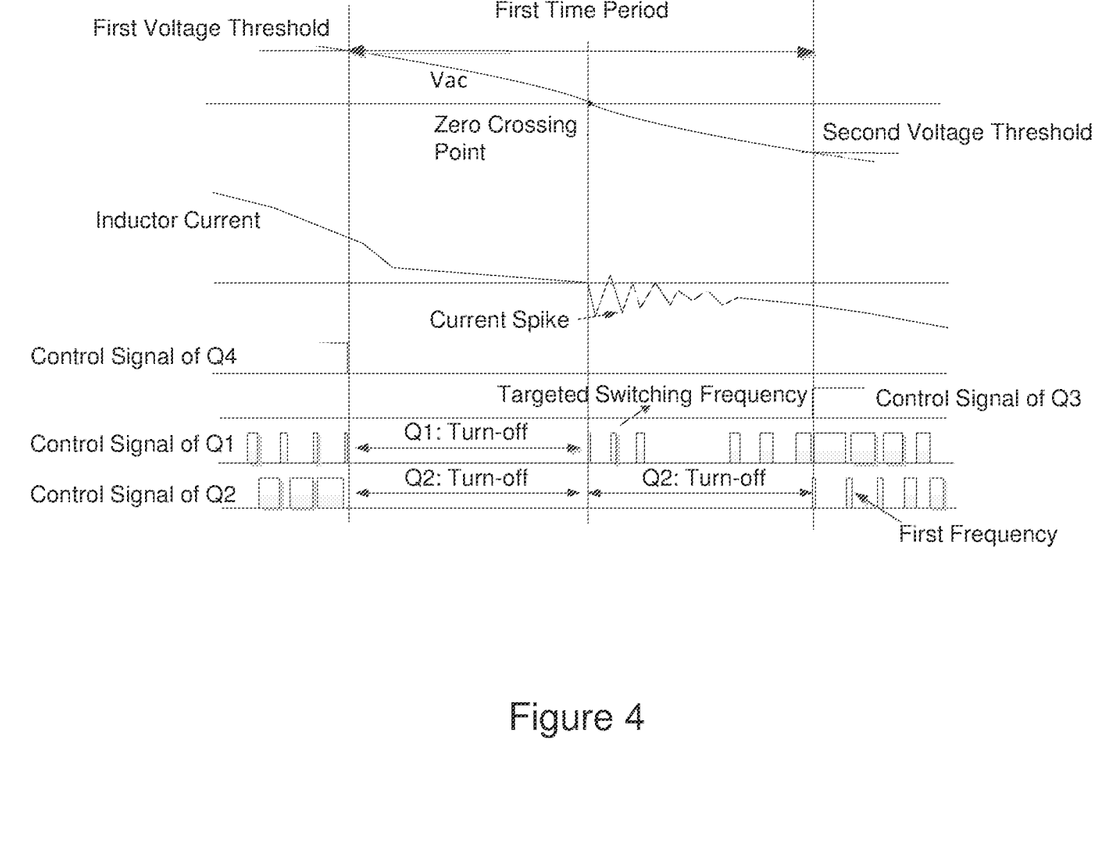
FIG. 4 and FIG. 5 show current waveforms according to an embodiment of the present disclosure.
Figure 5:
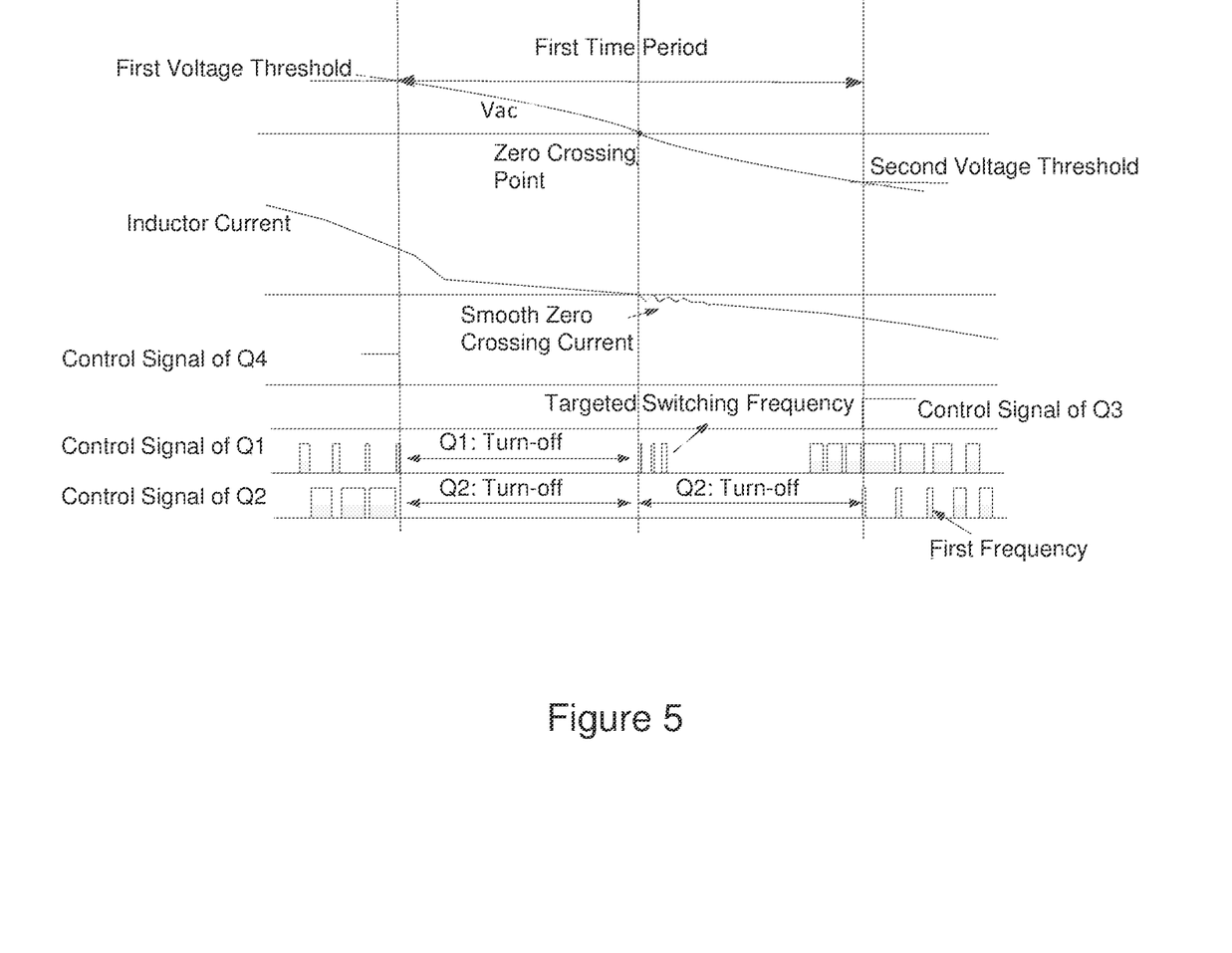

FIG. 4 and FIG. 5 show current waveforms according to an embodiment of the present disclosure.

In an example, as shown in FIG. 4, assuming that the targeted switching frequency is the first frequency or close to the first frequency, in the first time period (for example, the AC voltage Vac is lower than the first voltage threshold, and the time period is between the first voltage threshold and the second voltage threshold), when the direction of change of the AC voltage Vac is from a positive voltage to a negative voltage, and before the zero crossing of the AC voltage Vac is detected, the first control signal may be generated to control the first transistor Q1 and the second transistor Q2 to be in the off state before the AC voltage Vac crosses zero. When the zero crossing of the AC voltage Vac is detected, the second control signal can be generated to control the second transistor Q2 to be turned off, and control the first transistor Q1 to be turned on and off at the targeted switching frequency after the AC voltage Vac crosses zero. The turn-on duty cycle of Q1 increases linearly. In this case, since the targeted switching frequency is close to or equal to the first frequency, a current spike may still be generated when the AC voltage Vac crosses zero.

In a possible implementation manner, the targeted switching frequency is K times the first frequency. K is greater than one.

In a possible implementation, K is 2, 1.35, and so on.

In order to make the inductor current smoother when the AC voltage Vac crosses zero, and reduce or even eliminate the current spike, the implementation of the present disclosure can set the targeted switching frequency to be 1.5 times or more the first frequency. For example, the targeted switching frequency can be twice the first frequency.

In an example, as shown in FIG. 5, the targeted switching frequency is continuously increased. For example, when the targeted switching frequency is set to twice or nearly twice the first frequency, after the AC voltage Vac crosses zero, the smooth transition of the current flowing through the inductor can be realized, thereby eliminating the current spike.

It should be noted that the first frequency may be the frequency at which the first transistor and the second transistor normally operate. The present disclosure does not limit the specific value of the first frequency. Those skilled in the art can set it as needed. Accordingly, the targeted switching frequency can also be set according to the actual situation, as long as it is greater than the first frequency.

In one example, after the AC voltage crosses zero, the embodiment of the present disclosure sets the targeted switching frequency to be greater than the first frequency, and sets the duty cycle of the control signal to gradually increase so as to achieve a soft start. In the first time period, the duration of the second period of the soft start after the AC voltage crosses zero can be determined according to actual conditions. For example, it can be determined according to the parasitic capacitance and inductance of the transistor. Illustratively, the duration of the second period can be, for example, in a range from 150 µs to 250 µs. For example, it is 200 µs. Of course, the description of the duration above is exemplary and should not be regarded as a limitation of the present disclosure.

The description above has introduced an example in which the direction of change of the AC voltage Vac is from a positive voltage to a negative voltage. In other embodiments, the AC voltage Vac can also be changed from a negative voltage to a positive voltage. The following is an example of how to control under this situation.

In a possible implementation manner, the control module may also be used for the following: when it is determined that the direction of change of the AC voltage Vac is from a negative voltage to a positive voltage, the first control signal is generated to control the first transistor Q1 and the second transistor Q2 to be in the off state before the AC voltage Vac crosses zero.

The second control signal is generated to control the first transistor Q1 to be in an off state after the AC voltage Vac crosses zero, and control the second transistor Q2 to turn on and off at the targeted switching frequency. The turn-on duty cycle of Q2 gradually increases.

The embodiments of the present disclosure do not limit the specific implementation of the control signal generation, and those skilled in the art can use related technologies to implement the control signal generation.

In a possible implementation manner, a gradual increase of the turn-on duty cycle comprises increasing the turn-on duty cycle linearly or non-linearly until a full duty cycle is reached.

Figure 6:
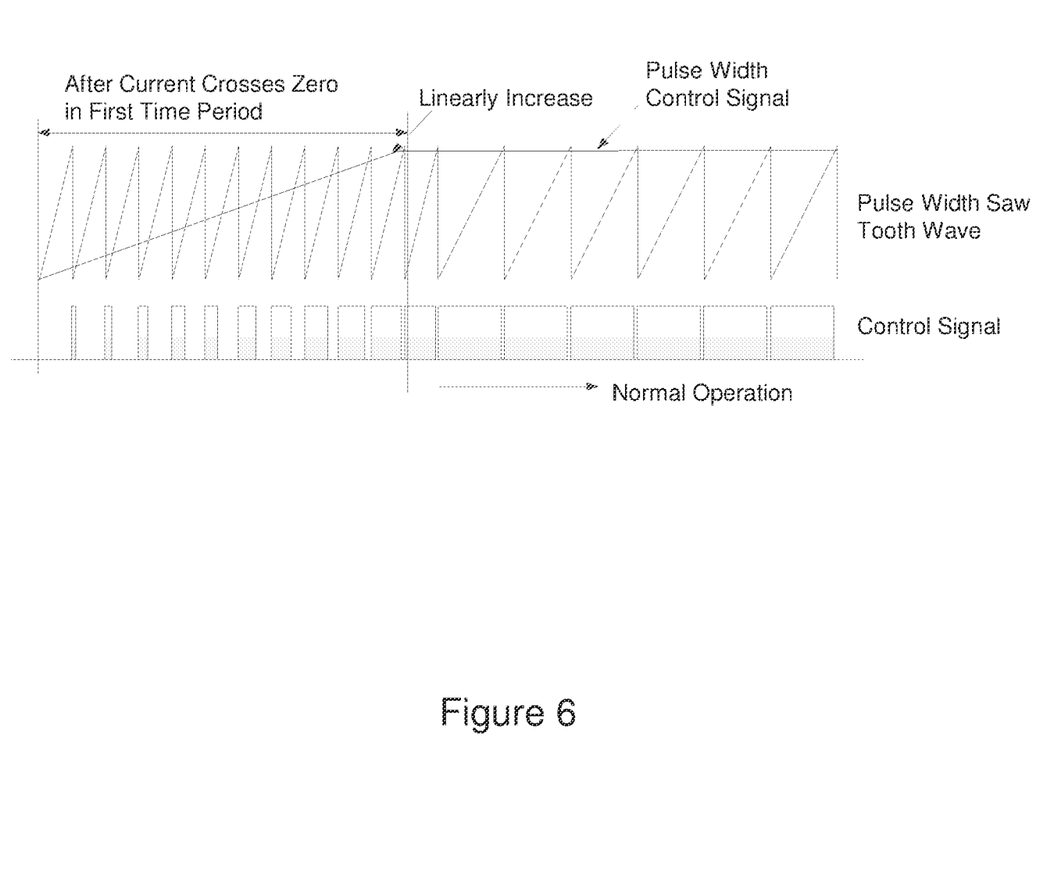
FIG. 6 shows a control signal according to an embodiment of the present disclosure.

FIG. 6 shows a control signal according to an embodiment of the present disclosure.

In an example, in the first time period, after detecting that the AC voltage Vac crosses zero, the control module may generate a control signal with a switching frequency greater than the first frequency to control the conduction state of the active transistor (which may be either the first transistor or the second transistor). The switching frequency is the targeted switching frequency. As shown in FIG. 6, the duty cycle of the control signal can be linearly increased until the control signal reaches or approaches the full duty cycle, and the control module generates a control signal having a switching frequency equal to the first switching frequency. The control signal informs the first transistor and the second transistor to operate normally.

Through the device described above, the embodiment of the present disclosure can generate the zeroth control signal in the first time period to control the third transistor and the fourth transistor to be in the off state, and perform zero-crossing detection on the alternating voltage of the AC power source. The embodiment of the present disclosure can generate a first control signal to control the conduction state of the first transistor and the second transistor before the AC voltage crosses zero, and generate a second control signal having a switching frequency greater than the normal operating frequency after the AC voltage crosses zero. The second control signal is used to control the conduction state of the first transistor and the second transistor. The second control signal is used to control one of the first transistor and the second transistor to be in the off state, and control the other transistor of the first transistor and the second transistor to be turned on and off at the targeted switching frequency. The turn-on duty cycle of the other transistor is gradually increased so that the device realizes a zero-crossing soft-start at the zero-crossing point. As a result, the current can be smoothly transitioned to improve the stability and efficiency of the device.

The embodiments of the present disclosure have been described above, and the above description is exemplary, not exhaustive, and is not limited to the disclosed embodiments. Without departing from the scope and spirit of the described embodiments, many modifications and changes are obvious to those of ordinary skill in the art. The choice of terms used herein is intended to best explain the principles, practical applications, or improvements to the technology in the market, or to enable other ordinary skilled in the art to understand the various embodiments disclosed herein.

What is claimed is:

1. A totem-pole bridgeless power factor correction device comprising:

a power factor correction module comprising a first transistor and a second transistor connected in series, and a third transistor and a fourth transistor connected in series, wherein the first transistor and the second transistor are configured to achieve power factor correction, and the third transistor and the fourth transistor are configured to achieve synchronous rectification; and a control module configured to:

in a first time period defined by a first voltage threshold and a second voltage threshold, control the third transistor and the fourth transistor to be off;

in the first time period and before a zero-crossing of an AC voltage applied to the power factor correction module, control the first transistor and the second transistor to be off;

in the first time period and after the zero-crossing of the AC voltage, control the first transistor and the second transistor such that at least one of the first transistor and the second transistor switches at a targeted switching frequency with a gradually increased duty cycle; and after the first time period, control the first transistor and the second transistor to switch at a switching frequency lower than the targeted switching frequency.

2. The totem-pole bridgeless power factor correction device of claim 1, wherein the power factor correction module comprises:

the first transistor and the second transistor connected in series between a first voltage bus and a second voltage bus;

the third transistor and the fourth transistor connected in series between the first voltage bus and the second voltage bus; and an inductor having a first terminal connected to a common node of the first transistor and the second transistor, and a second terminal connected to a first terminal of an AC power source, and wherein a second terminal of the AC power source is connected to a common node of the third transistor and the fourth transistor.

3. The totem-pole bridgeless power factor correction device of claim 2, wherein the power factor correction module further comprises a first capacitor, a second capacitor, and a third capacitor, and wherein:

the first capacitor is connected in parallel with the third transistor;

the second capacitor is connected in parallel with the fourth transistor; and the third capacitor is connected between the first voltage bus and the second voltage bus.

4. The totem-pole bridgeless power factor correction device of claim 1, wherein the control module is configured to:

generate a zeroth control signal in the first time period to control the third transistor and the fourth transistor to be off;

perform a zero-crossing detection on the AC voltage in the first time period;

generate a first control signal before the AC voltage crosses zero to control a conduction state of the first transistor and the second transistor;

after the AC voltage crosses zero, generate a second control signal to control the conduction state of the first transistor and the second transistor, and wherein the first control signal and the second control signal are configured such that:

the first transistor and the second transistor are turned off before the AC voltage crosses zero; and one of the first transistor and the second transistor is configured to be turned off after the AC voltage crosses zero, and the other of the first transistor and the second transistor is configured to be turned on and off at the targeted switching frequency, and wherein a turn-on duty cycle of the other of the first transistor and the second transistor gradually increases; and after the first time period, generate a third control signal to control the first transistor and the second transistor to switch at a first frequency, and control the third transistor and the fourth transistor to switch at a second frequency, and wherein the targeted switching frequency is greater than the first frequency, and the first frequency is greater than the second frequency.

5. The totem-pole bridgeless power factor correction device of claim 4, wherein the control module is configured to:
determine a direction of an AC voltage change; and
generate the first control signal and the second control signal according to the direction of the AC voltage change.

6. The totem-pole bridgeless power factor correction device of claim 4, wherein:
the targeted switching frequency is K times greater than the first frequency, and wherein K is greater than 1.

7. The totem-pole bridgeless power factor correction device of claim 4, wherein:
the targeted switching frequency is set to twice the first frequency to attenuate current spikes.

8. The totem-pole bridgeless power factor correction device of claim 1, wherein:
when a direction of an AC voltage change is from a positive voltage to a negative voltage, the control module is configured to:
generate a first control signal to control the first transistor and the second transistor to be off before the AC waveform crosses zero; and
generate a second control signal to control the second transistor to be off after the AC voltage crosses zero, and to control the first transistor to be turned on and off at the targeted switching frequency, and wherein a turn-on duty cycle of the first transistor gradually increases.

9. The totem-pole bridgeless power factor correction device of claim 1, wherein:
when a direction of an AC voltage change is from a negative voltage to a positive voltage, the control module is configured to:
generate a first control signal to control the first transistor and the second transistor to be off before the AC waveform crosses zero; and
generate a second control signal to control the first transistor to be off after the AC voltage crosses zero, and to control the second transistor to be turned on and off at the targeted switching frequency, and wherein a turn-on duty cycle of the second transistor gradually increases.

10. A method comprising:
configuring a first transistor and a second transistor of a power factor correction module to achieve power factor correction, and configuring a third transistor and a fourth transistor of the power factor correction module to achieve synchronous rectification;
in a first time period defined by a first voltage threshold and a second voltage threshold on an AC voltage applied to the power factor correction module, configuring the third transistor and the fourth transistor to be off;
in the first time period and before a zero-crossing of the AC voltage, configuring the first transistor and the second transistor to be off;
in the first time period and after the zero-crossing of the AC voltage, configuring at least one of the first transistor and the second transistor to switch at a targeted switching frequency with a gradually increased duty cycle; and
after the first time period, configuring the first transistor and the second transistor to switch at a switching frequency lower than the targeted switching frequency.

11. The method of claim 10, further comprising:
determining a direction of an AC voltage change; and
in response to the AC voltage change from a positive voltage to a negative voltage, generating a first control signal to control the first transistor and the second transistor to be off before the AC waveform crosses zero, and generating a second control signal to control the second transistor to be off state after the AC voltage crosses zero, and to control the first transistor to be turned on and off at the targeted switching frequency, and wherein a turn-on duty cycle of the first transistor gradually increases.

12. The method of claim 10, further comprising:
determining a direction of an AC voltage change; and
in response to the AC voltage change from a negative voltage to a positive voltage, generating a first control signal to control the first transistor and the second transistor to be off before the AC waveform crosses zero, and generating a second control signal to control the first transistor to be off after the AC voltage crosses zero, and to control the second transistor to be turned on and off at the targeted switching frequency, and wherein a turn-on duty cycle of the second transistor gradually increases.

13. The method of claim 10, further comprising:
in the first time period and after the zero-crossing of the AC voltage, adjusting the gradually increased duty cycle until a full duty cycle is reached.

14. The method of claim 10, further comprising:
in a positive half cycle of the AC voltage and out of the first time period, configuring the fourth transistor to be turned on, and configuring the third transistor to be turned off.

15. The method of claim 10, further comprising:
in a negative half cycle of the AC voltage and out of the first time period, configuring the third transistor to be turned on, and configuring the fourth transistor to be turned off.

16. The method of claim 10, wherein the power factor correction module comprises:
the first transistor and the second transistor connected in series between a first voltage bus and a second voltage bus;
the third transistor and the fourth transistor connected in series between the first voltage bus and the second voltage bus; and
an inductor having a first terminal connected to a common node of the first transistor and the second transistor, and a second terminal connected to a first terminal of an AC power source, and wherein a second terminal of the AC power source is connected to a common node of the third transistor and the fourth transistor.

17. The method of claim 10, further comprising:
generating a zeroth control signal in the first time period to control the third transistor and the fourth transistor to be off;
performing a zero-crossing detection on the AC voltage in the first time period;
generating a first control signal before the AC voltage crosses zero to control a conduction state of the first transistor and the second transistor; and
after the AC voltage crosses zero, generating a second control signal to control the conduction state of the first transistor and the second transistor.

18. The method of claim 17, wherein the first control signal and the second control signal are configured such that:
the first transistor and the second transistor are turned off before the AC voltage crosses zero; and
one of the first transistor and the second transistor is configured to be turned off after the AC voltage crosses zero, and the other of the first transistor and the second transistor is configured to be turned on and off at the targeted switching frequency; and
after the first time period, a third control signal is generated to control the first transistor and the second transistor to switch at a first frequency, wherein the targeted switching frequency is greater than the first frequency.

19. A controller comprising:
a plurality of function units electrically coupled to control terminals of a first transistor, a second transistor, a third transistor and a fourth transistor in a power factor correction module, wherein the first transistor and the second transistor are configured to achieve power factor correction, and the third transistor and the fourth transistor are configured to achieve synchronous rectification, and wherein the controller is configured to:
in a first time period defined by a first voltage threshold and a second voltage threshold on an AC voltage applied to the power factor correction module, control the third transistor and the fourth transistor to be off;
in the first time period and before a zero-crossing of the AC voltage, control the first transistor and the second transistor to be off;
in the first time period and after the zero-crossing of the AC voltage, control at least one of the first transistor and the second transistor to switch at a targeted switching frequency with a gradually increased duty cycle; and
after the first time period, control the first transistor and the second transistor to switch at a switching frequency lower than the targeted switching frequency.

20. The controller of claim 19, wherein the power factor correction module comprises:
the first transistor and the second transistor connected in series between a first voltage bus and a second voltage bus;
the third transistor and the fourth transistor connected in series between the first voltage bus and the second voltage bus; and
an inductor having a first terminal connected to a common node of the first transistor and the second transistor, and a second terminal connected to a first terminal of an AC power source, and wherein a second terminal of the AC power source is connected to a common node of the third transistor and the fourth transistor.

* * * * *